Aug. 28, 1962 C. H. BYERS 3,051,258
VEHICLE OPERATOR ALARM
Filed April 6, 1960

Clarence H. Byers
INVENTOR.

3,051,258
VEHICLE OPERATOR ALARM
Clarence H. Byers, 510 6th Ave. N., Princeton, Minn.
Filed Apr. 6, 1960, Ser. No. 20,450
16 Claims. (Cl. 180—82)

This invention relates to motor vehicle alarm devices for alerting motor vehicle operators and also to devices for altering the operation of the motor vehicle simultaneously with the actuation of the alarm.

Briefly, the invention is embodied in an assembly adapted to be applied to existing motor vehicles or to be included as original equipment. The assembly functions to alert a drowsy motor vehicle operator, and if the operator cannot be alerted by the production of sound at a reasonable sound level, the motor vehicle horn commences operation thereby giving an audible warning to others of the impeding danger. At the time of this audible warning, the motor vehicle is altered in its operation, for example the brakes may be applied and the ignition circuit opened. Alternatively, this rather drastic step, i.e., the stopping of the motor vehicle and the opening of the ignition circuit, may be achieved at the time of the first warning, which would be the initial sound alarm for the motor vehicle operator.

Accordingly, an object of the invention is to provide a unique assembly of components providing for a sequence of alarms and safety operations, all centering about motor vehicle safety for the motorist, the occupants of the motor vehicle and for operators of the other motor vehicles in the vicinity, pedestrians, property, etc.

Although there have been prior alarm systems proposed, the system in accordance with the invention differs from previous systems by using components that are rather easily installed in a motor vehicle and by the particular sequence of operations which need not be carried to a completion once the cycle begins. For example, if the motor vehicle operator becomes drowsy and the initial signal is given, should the motor vehicle operator be sufficiently alert, he may promptly manually discontinue the cycle of operation since the motor vehicle operator, being awakened, is in a sufficiently alert condition to operate his motor vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
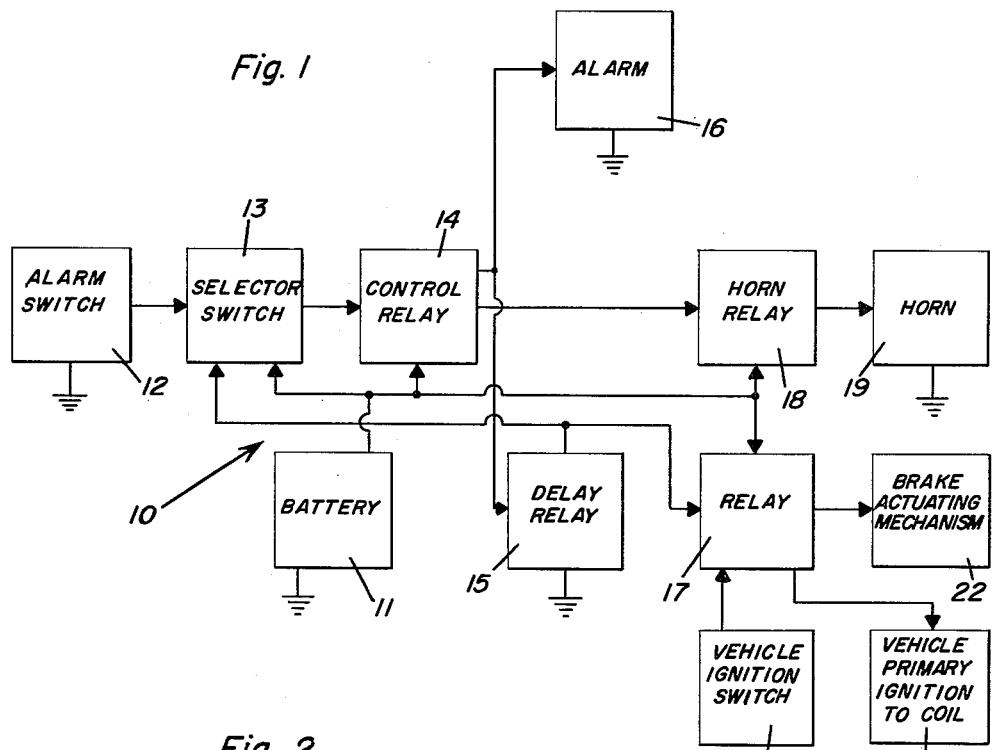
FIGURE 1 is a diagrammatic view showing the system applied to a motor vehicle electrical circuit.

In the accompanying drawing reference is first made to FIGURE 1 showing in block form the various components of system 10. These are provided with legends, and some of them, of course, are representative of existing equipment in a motor vehicle.

Battery 11 diagrammatically represents a source of electrical potential. The alertness responsive alarm switch 12 may be any switch under the control of the motor vehicle operator. For instance, the alarm switch may be the existing horn switch of the motor vehicle and therefore, the alarm switch is shown connected to ground. Alarm switch 12 is connected with selector switch 13, and the selector switch is, in turn, connected with control relay 14. Time delay relay 15 is shown connected with alarm control relay 14 and with an alerting signal alarm 16, the latter being audible and/or visual such as a bell, horn, blinking light, etc. Alarm 16 is for the motorist.

Control relay 17 is connected with delay relay 15 and selector switch 13. Horn relay 18 is operatively connected between relay 17 and selector switch 13 through relay 14, and the horn 19 of the motor vehicle is operatively connected with horn relay 18 and to ground. The horn 19 is the conventional motor vehicle horn, and the sounding thereof is for issuing a warning to the adjacent pedestrian and motoring public.

The vehicle ignition switch 20 is shown connected with relay 17, and the motor vehicle primary ignition coil 21 is interrupted by way of relay 17 and ground in response to a predetermined operation as will be described more in detail subsequently. The brake actuating mechanism 22 whose purpose is to stop the motor vehicle, is operatively connected with relay 17. The brake actuating mechanism 22 is operated simultaneously with the opening of the ignition circuit as at 21, so that the motor vehicle may be brought to a quick stop.

Figure 2:
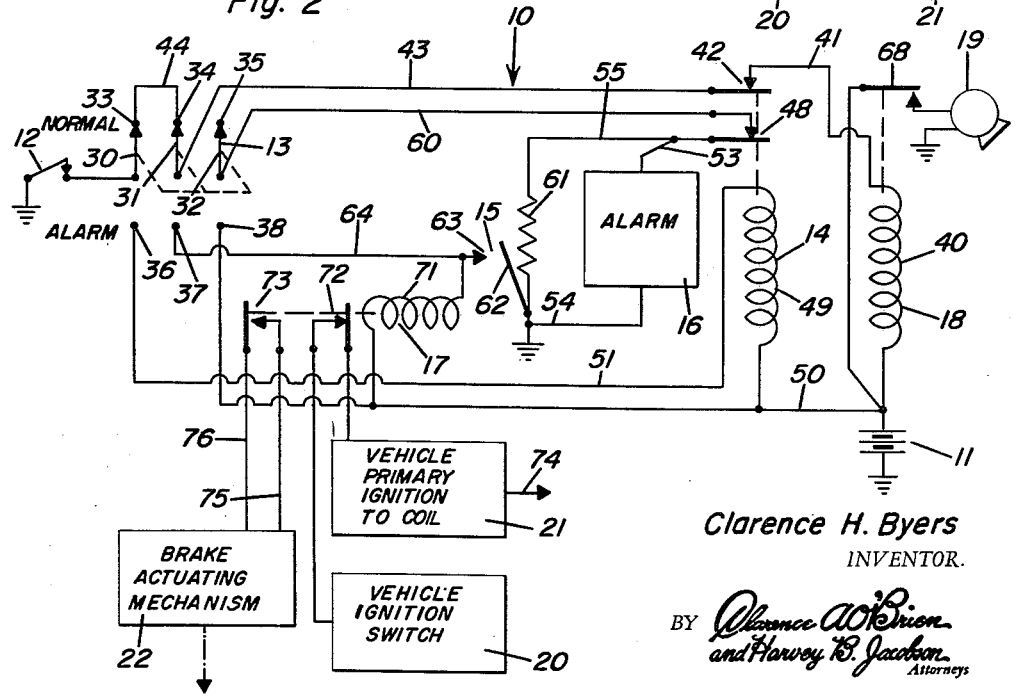
FIGURE 2 is a further diagrammatic view showing more particularly one possible embodiment of the invention.

FIGURE 2 illustrates the actual physical connections between the various components for one exemplary embodiment, FIGURE 1 being only a block diagram to illustrate the basic relationships. Battery 11 is shown with one side grounded and the other side operatively connected in the vehicle operator alarm system exemplifying the invention. Alarm switch 12 is connected to ground and may be in the form of a special switch, but it is preferably the horn switch furnished as part of the motor vehicle, horn switches presently being equipped with horn rings. Selector switch 13 is a triple pole, double throw switch with three movable contactors 30, 31 and 32 and two groups of fixed contacts. Contacts 33, 34 and 35 comprise one group, and contacts 36, 37 and 38 comprise the other group. The normal position of selector switch 13 is identified by a legend, and the alarm position is similarly identified. When selector switch 13 is in the normal position as shown in FIGURE 2, the closing of alarm switch 12 will cause the horn 19 to be sounded in the usual way in this manner: current flows from battery 11 to the horn 19 by way of normally open switch section 68 of relay 18 and a jumper wire to the battery. The relay 18 is energized to close switch section 68 by having current flow through coil 40 of horn relay 18, conductor 41 attached to one end of coil 40, normally closed switch section 42 of control relay 14, conductor 43 extending from the contacts of switch section 42 and then through selector switch 13 to switch 12 and ultimately to ground inasmuch as switch 12 is connected to ground. Two portions of selector 13 are used, and they are movable contactor 31, fixed contact 34, a jumper 44 between fixed contacts 34 and 33, and movable contactor 30 which is connected with the contacts of switch 12.

However, when selector switch 13 is adjusted to the alarm position a different operation results. Upon closing switch 12 that is, depressing the horn ring of the motor vehicle or depressing an attachment on the horn ring placed close to the rim of the steering wheel (for convenience), the alarm control relay 14 operates causing switch sections 42 and 48 thereof to open. The current path is from battery 11 to coil 49 of control relay 14 by way of conductor 50. The current flows through conductor 51 which is attached to an end of coil 49, to fixed contact 36, movable contactor 30 of selector switch 13, and to ground by way of switch 12. Since the switch sections 42 and 48 become open, the other two portions of selector switch 13 are connected to open circuits. Alarm 16 is connected by conductor 54 to ground and by conductor 53 to conductor 55 which is operatively connected with switch section 48. Since the switch section 48 is now open by energization of the coil of control relay 14, no current flows through the alarm 16.

However as the motor vehicle operator becomes drowsy, pressure on the alarm switch 12 is reduced, and the switch 12 will finally open when the pressure level is reduced below a predetermined value. The opening of switch 12 causes the alarm control relay 14 to be de-energized since the ground path established in part by conductor 51, is opened. Since switch sections 42 and 48 of control relay 14 are normally closed, these sections will revert to the closed position. When switch section 48 closes an electrical connection is made from battery 11 through conductor 50, through fixed contact 38 and contactor 32 of selector switch 13, and conductor 50. Current flows through conductors 53, alarm 16 conductor 54 and to ground thereby sounding the alarm. Also, time delay relay 15 is simultaneously energized with the energization of alarm 16 since time delay relay 15 is connected in parallel with alarm 16. The actual energization of the delay relay 15 is through the heater 61 thereof and to ground. After the time delay, for instance approximately three seconds, the bimetal strip 62 of the time delay relay will swing to a position at which it engages contact 63 of relay 15 thereby energizing the horn relay 18 by way of conductor 64 that is attached to contact 63, contact 37, contactor 31 of selector switch 13, conductor 43, switch section 42 of relay 14 and conductor 41. This energizes the horn relay 18, causing the switch section 68 thereof to close and operate horn 19. This is the desired warning signal for adjacent motorists or pedestrians.

If the motor vehicle operator is immediately alerted when alarm 16 operates and should close switch 12, the electrical circuit through alarm control relay 14 is again completed silencing the alarm by the opening of switch sections 42 and 48. If the motorist desires to sound the horn 19 when selector switch 13 is in the alarm position, the horn 19 may be sounded instantly by maintaining pressure on the switch 12 and operating the selector switch 13 to the normal position. The horn could also be sounded when the selector switch 13 is in the alarm position by releasing the switch 12, and the horn 19 would emit a sound after a brief delay occasioned by actuation of time delay relay 15.

Although the continual sound is emitted by horn 19 under a condition considered as emergency by the drowsiness of the vehicle operator, additional steps are taken by the system 10. Relay 17 has coil 71 connected across conductors 64 and 50 so that coil 71 becomes energized from battery 11 when delay relay 15 closes. In other words, a ground path is established from battery 11 by way of conductor 50, the coil 71, contact 63 and movable contactor (bimetallic) 62 and ground. Relay 17 has two switch sections 72 and 73 with switch section 72 being normally closed and switch section 73 being normally open. The vehicle ignition switch controls the ignition circuit in an ordinary motor vehicle, and the ignition circuit 74 is interrupted by means of the normally closed switch section 72 of relay 17. When the relay 17 is activated, this being simultaneous with the closing of relay 15 and the actuation of horn relay 18, the ignition circuit is opened since the normally closed switch section 72 of relay 17 opens. A suggested connection with the vehicle ignition system would be to have switch section 72 interposed in the primary circuit of the ignition coil.

A brake actuation mechanism for the brake system in the motor vehicle is identified diagrammatically at 22. This brake actuation mechanism may include a number of alternatives, one of which is a solenoid connected with the brake pedal arm of the brake system and arranged to depress the brake pedal and arm when the solenoid is energized. Therefore, there are two conductors 75 and 76 connected with the solenoid (not shown) and connected with switch section 73 of relay 17. The switch section 73 is a normally open section whereby upon energization of the coil 71 of relay 17, switch section 73 is closed thereby promptly applying the braking action of the brake system of the motor vehicle. The obvious purpose is to decelerate and stop the motor vehicle to lessen or prevent injury and damage should the motorist become ill or drowsy to such an extent that the switch 12 is not held in a closed position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An alarm system for a motor vehicle which has a horn and a horn relay operatively connected with the horn to control the operation of the horn, a source of electrical potential with which the horn relay is operatively connected, said system comprising a normally open switch adapted to be held manually in a closed position by the vehicle operator, a multi-pole, multi-position selector switch with which said manual switch is connected, means connected with a battery to provide potential at such selector switch, a control relay having two switch sections and a coil which is connected with said battery and said selector switch, said two switch sections of said control relay also connected with said selector switch, an alarm connected with one of said switch sections and to ground so that said alarm is rendered operative in response to closing said one of said switch sections by opening said manual switch, a time delay relay connected in parallel with said alarm and operatively connected through said selector switch to the other of said switch sections, and means connected with said other of said switch sections for energizing said horn relay when said time delay relay is activated to thereby provide an exterior warning to pedestrian and vehicular traffic.

2. The combination of claim 1 including an auxiliary relay having a coil operatively connected with the delay relay and battery and establishing a ground connection through said delay relay, means operatively connected to said auxiliary relay for altering the operation of the motor vehicle when said auxiliary relay is activated, said last-mentioned means including a device to interrupt the ignition system of the motor vehicle and a device for operating the brakes of the motor vehicle, and said auxiliary relay including a normally open switch section and a normally closed switch section respectively.

3. A safety system for vehicles having a traffic horn, comprising alertness responsive means selectively operable to actuate the horn, selector means operatively connected to the alertness responsive means and selectively operable to render the alertness responsive means ineffective to operate the horn by selective actuation thereof, driver alerting signal means operatively connected to the selector means and selectively rendered operative by the alertness responsive means in response to driver drowsiness, and control means operatively connected to the driver alerting signal means and selector means for rendering the horn operative for traffic warning purposes in response to continued driver drowsiness after operation of the driver alerting signal means for a predetermined period of time.

4. The combination of claim 3 including vehicle stopping means operatively connected to the control means and rendered operative simultaneously with the horn in response to continued drowsiness of the driver.

5. The combination of claim 4, wherein said alertness responsive means comprises open switch means selectively actuated to a closed position to operate the horn and selectively released to an open position when ineffective to operate the horn, to operate the driver alerting signal means.

6. The combination of claim 5, wherein said driver alerting means comprises audible alarm means mounted internally of the vehicle and rendered operative by the selector means in response to release of the open switch means.

7. The combination of claim 6, wherein said selector means comprises circuit changing means and separate circuit means connected between the circuit changing means, horn and driver alerting signal means for selectively closing and interrupting power circuits between the alertness responsive means and the horn and the driver alerting signal means.

8. The combination of claim 7, wherein said control means comprises horn relay means operatively connected to the alertness of responsive means for operating the horn upon actuation thereof, alarm relay means operatively connected to the horn relay means for disabling thereof in response to selective operation of the selector means and simultaneously conditioning the driver alerting signal means for operation by the alertness responsive means and time delay relay means operatively connected to the alerting signal means rendered operative following continuous operation of said alerting signal means for said predetermined period of time to render the horn relay means operative.

9. The combination of claim 8, wherein said vehicle stopping means comprises control relay means operatively connected to the time delay relay means of the control means and rendered operative with the horn relay means, and vehicle ignition cutting and brake actuating means operatively connected to the control relay means for operation thereby.

10. The combination of claim 3, wherein said alertness responsive means comprises open switch means selectively actuated to a closed position to operate the horn and selectively released to an open position when ineffective to operate the horn, to operate the driver alerting signal means.

11. The combination of claim 3, wherein said driver alerting means comprises audible alarm means mounted internally of the vehicle and rendered operative by the selector means in response to release of the alertness responsive means.

12. The combination of claim 3, wherein said selector means comprises circuit changing means and separate circuit means connected between the circuit changing means, horn and driver alerting signal means for selectively closing and interrupting power circuits between the alertness responsive means and the horn and the driver alerting signal means.

13. The combination of claim 3, wherein said control means comprises horn relay means operatively connected to the alertness responsive means for operating the horn upon actuation thereof, alarm relay means operatively connected to the horn relay means for disabling thereof in response to selective operation of the selector means and simultaneously conditioning the driver alerting signal means for operation by the alertness responsive means and time delay relay means operatively connected to the alerting signal means rendered operative following continuous operation of said alerting signal means for said predetermined period of time to render the horn relay means operative.

14. The combination of claim 13, including vehicle stopping means operatively connected to the control means and rendered operative simultaneously with the horn in response to continued drowsiness of the driver.

15. The combination of claim 14, wherein said vehicle stopping means comprises control relay means operatively connected to the time delay relay means of the control means and rendered operative with the horn relay means, and vehicle ignition cutting and brake actuating means operatively connected to the control relay means for operation thereby.

16. A safety system for a vehicle having a relay operated traffic horn, comprising, horn switch means, horn relay circuit means for operating the horn when closed, driver alarm means mounted internally of the vehicle, alarm circuit means electrically connected to the driver alarm means, alarm relay means including relay switch means connected to the horn relay circuit means and to the alarm circuit means for interruption of both circuit means when opened by energization of the alarm relay means, selector switch means electrically connected to the horn switch means, alarm relay and alarm circuit means, said selector means being operative in one position to close the horn relay circuit means when the horn switch means is closed and operative in a second position to open the horn relay circuit means, close the alarm circuit means and energize the alarm relay means when the horn switch means is closed thereby opening the relay switch means, time delay relay means electrically connected in parallel with the driver alarm means including a relay switch closed after a predetermined period of operation of the alarm means by closing of the alarm circuit means, control circuit means electrically connected to the relay switch and the selector switch means for closing the horn relay circuit means upon closing of the relay switch and vehicle control relay means in the control circuit means energized simultaneously with the closing of the horn relay circuit means by the relay switch.

References Cited in the file of this patent

UNITED STATES PATENTS

| 2,172,116 | Warren | Sept. 5, 1939 |
| 2,296,003 | Van Loo | Sept. 15, 1942 |
| 2,625,594 | Mathis | Jan. 13, 1953 |

FOREIGN PATENTS

| 20,028 | Australia | June 24, 1935 |
| 559,226 | Italy | Mar. 16, 1957 |
| 163,441 | Sweden | June 10, 1958 |